(12) United States Patent
Bender

(10) Patent No.: US 11,886,939 B2
(45) Date of Patent: Jan. 30, 2024

(54) SYSTEM, DEVICE, METHOD AND DATASTACK FOR MANAGING APPLICATIONS THAT MANAGE OPERATION OF ASSETS

(71) Applicant: SIEMENS AKTIENGESELLSCHAFT, Munich (DE)

(72) Inventor: Philipp Bender, Rülzheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/780,020

(22) PCT Filed: Sep. 25, 2020

(86) PCT No.: PCT/EP2020/076851
§ 371 (c)(1),
(2) Date: May 25, 2022

(87) PCT Pub. No.: WO2021/104713
PCT Pub. Date: Jun. 3, 2021

(65) Prior Publication Data
US 2022/0405157 A1    Dec. 22, 2022

(30) Foreign Application Priority Data
Nov. 27, 2019 (EP) .................................... 19211830

(51) Int. Cl.
*G06F 9/54* (2006.01)
(52) U.S. Cl.
CPC .............. *G06F 9/546* (2013.01); *G06F 9/543* (2013.01)

(58) Field of Classification Search
None
See application file for complete search history.

(56) References Cited

U.S. PATENT DOCUMENTS

2017/0236067 A1    8/2017 Tjiong

FOREIGN PATENT DOCUMENTS

EP    3246779 A1    11/2017

OTHER PUBLICATIONS

PCT International Preliminary Examination Report and Written Opinion of International Examination Authority dated Feb. 7, 2022, corresponding to PCT International Application No. PCT/EP2020/076851.
PCT International Search Report and Written Opinion of International Searching Authority dated Dec. 23, 2020, corresponding to PCT International Application No. PCT/EP2020/076851.

*Primary Examiner* — Syed A Roni
(74) *Attorney, Agent, or Firm* — Lempia Summerfield Katz LLC

(57) ABSTRACT

A system, device, method, and datastack for managing applications that manage operation of assets are provided. In the method, data is shared between the applications. The method includes generating, by a first application of the applications, one or more metadata stacks associated with one or more assets. The one or more metadata stacks include at least one metadata string generated based on operation of the one or more assets. Access to the one or more metadata stacks is enabled. A second application of the applications is capable of accessing the one or more metadata stacks and datapoints associated with the one or more metadata stacks.

11 Claims, 4 Drawing Sheets

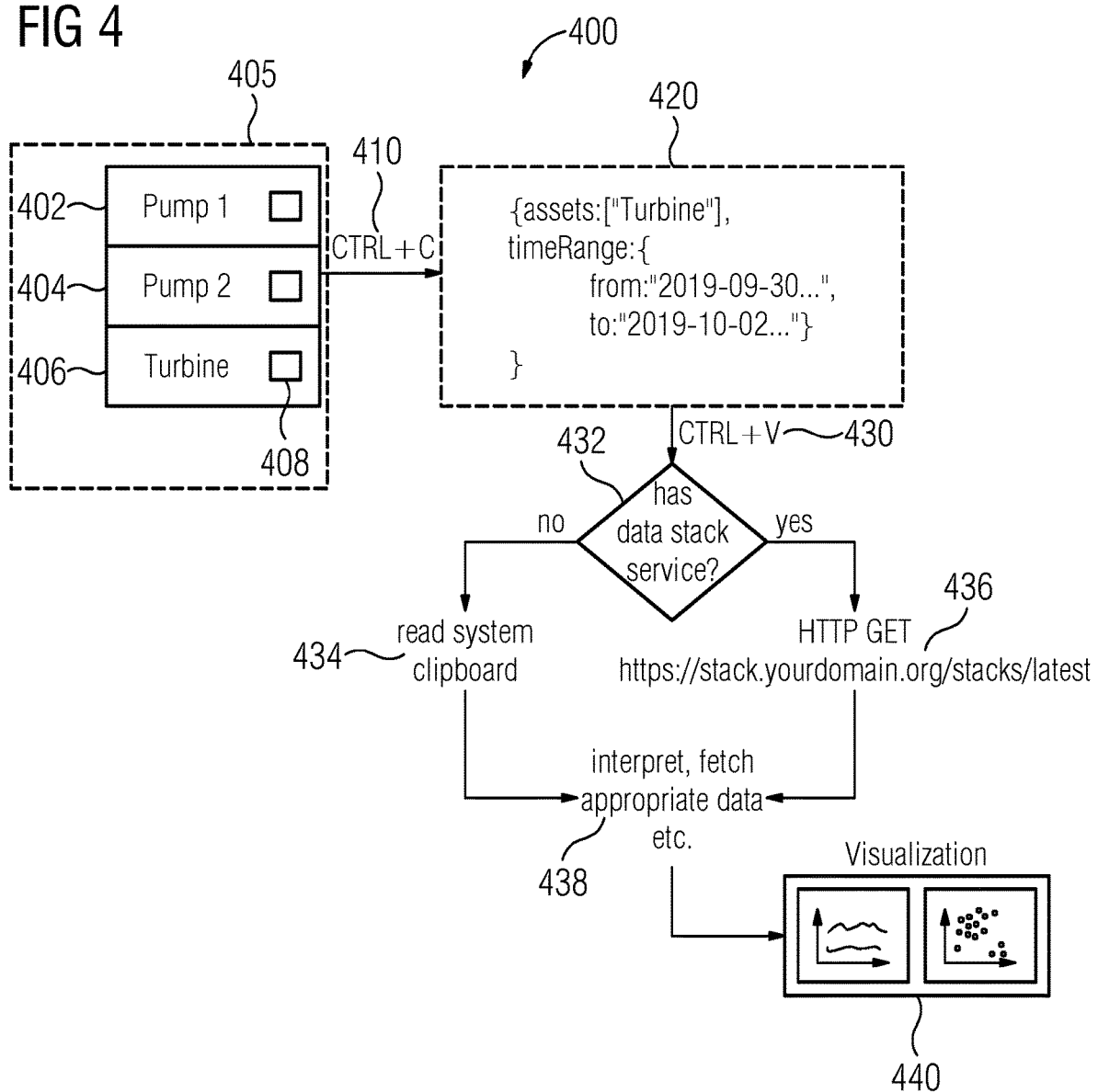

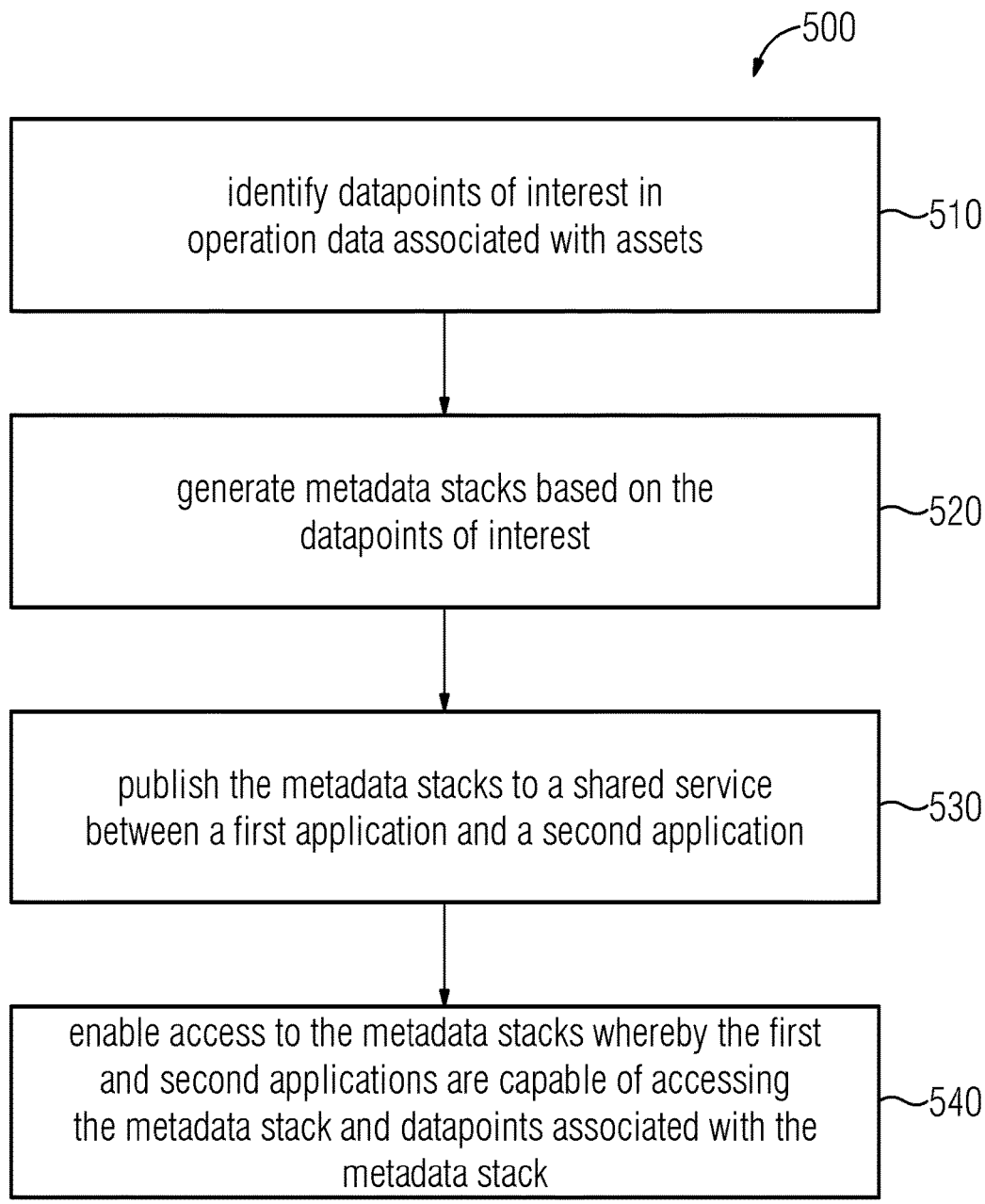

SYSTEM, DEVICE, METHOD AND DATASTACK FOR MANAGING APPLICATIONS THAT MANAGE OPERATION OF ASSETS

This application is the National Stage of International Application No. PCT/EP2020/076851, filed Sep. 25, 2020, which claims the benefit of European Patent Application No. EP 19211830.5, filed Nov. 27, 2019. The entire contents of these documents are hereby incorporated herein by reference.

BACKGROUND

The present disclosure is directed, in general, to the management of applications for assets and specifically to managing data by the applications.

With advent of cloud computing technology and edge/fog computing technology, a large number of devices are connected to a cloud computing platform or a fog computing platform via the wired/wireless network. For example, the devices may be equipment, sensors, actuators, robots, and/or machinery in an industrial set-up(s). The devices may be medical devices and equipment in a healthcare unit. The devices may be communication devices, home appliances, or office appliances in a residential/commercial establishment. The devices are also commonly known as 'assets'.

The cloud computing platform and fog computing platform may host multiple applications for configuring, monitoring, controlling, and maintaining connected assets. In certain scenarios, a single controller may be used to run the applications and thereby manage operation of the assets.

Generally, the applications may provide different services while operating on the same datapoints or same series of datapoints. Sharing datapoints across multiple applications may pose challenges in arriving at meaningful results. Such systems and methods may benefit from improvements.

SUMMARY AND DESCRIPTION

Variously disclosed embodiments include system, device, method, and datastack to facilitate management of applications by managing sharing of data between the applications.

In an example, a method for sharing data between at least two applications is disclosed. The method includes, through operation of at least one processor: generating, by a first application of the at least two applications, one or more metadata stacks associated with one or more assets. The metadata stacks include at least one metadata string generated based on the operation of the assets. Access to the metadata stacks is enabled by the first application, where a second application of the at least two applications is capable of accessing the metadata stack and datapoints associated with the metadata stack.

In another example, a computing platform for managing at least two applications includes a shared service between the at least two applications in a distributed computing environment. The shared service is configured to enable access to at least one metadata stack generated by a first application of the at least two applications. The applications are configured to manage operation of at least one asset using the computing platform. The metadata stack includes at least one metadata string generated based on the operation of the assets.

In another example, a device for managing at least two applications includes a firmware module including an operating system including one or more native tools configured to perform at least one command. The command may include a copy command, a paste command, or a snip command. A first application of the at least two applications is configured to generate at least one metadata stack associated with operation data of the asset. The first application enables access to the operation data via the metadata stack using the native tools. The metadata stack includes at least one metadata string generated based on the operation of the assets.

In yet another example, a metadata stack for managing at least two applications includes one or more metadata strings associated with at least one asset. The metadata strings include at least one of: an asset identifier; a timestamp; and a unique identifier that is referenceable by one or more applications.

A further example may include a non-transitory computer readable medium encoded with executable instructions (e.g., a software component on a storage device) that, when executed, cause at least one processor to carry out this described method.

Before describing the suggested convention in more detail, various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments. Features explained in the context of the suggested method may also be comprised by the suggested system by appropriately configuring and adapting the system and vice versa.

As used herein, "metadata" refers to data that describes the heterogenous data streams. The metadata may be tags that add meaning to one or more data points in the heterogenous data streams. Metadata examples include unique identification number, type of asset, firmware version, warranty version, anti-virus software, security certificates, software patches, and/or components of the asset. For example, the metadata are generated using multiple annotation techniques. In another example, the metadata may be generated by performing a sensitivity analysis on the data points in the heterogenous data streams. In yet another example, the metadata may be autonomously learnt using associative networks.

As used herein, applications refer to software programs that are used to provide a particular function or service. The applications may be interactive or non-interactive. The applications may be executable/executed on the same device or on different devices at different time instants. Example applications may include an application for monitoring operation of robots in a manufacturing facility. The application may be capable of analyzing the data collected from the robots over a period of time. Another application may be related to anomaly detection in the operation of robots. Both the condition monitoring application and the anomaly detection application may use the same operation data associated with the robots.

Copying of data from one application to another may result in copying of individual datapoints. Further, the first application may not necessarily use the operation data in contiguous time-series form (also referred to as time-series data). In an example, an anomaly detection application may need a predetermined amount of training data to learn operating conditions associated with the assets. In this scenario, it may take a considerable amount of time (e.g., two months) to learn the operating conditions. In certain circumstances, only few datapoints from the two months of the time-series data may be used. For example, when there was a failure associated with the assets, failure data may not be preferred as training data. Accordingly, the present embodiments exclude the failure data while generating the meta data stack. Therefore, the present embodiments assemble datapoints of interest that may not be contiguous and may span over multiple assets. Therefore, the present embodiments enable accumulation of observations across multiple applications without manual search and selection in the individual applications.

Further, the present embodiments enable the applications to reference the datapoints between the applications without explicitly calling the datapoints. The datapoints selected in one application (e.g., the condition monitoring application) may be consumed by the outlier detection application using the metadata stack.

The metadata stack is shared or referenced by the applications with m:n (many to many) relationship between the application and the metadata stack. By sharing the metadata stacks, semantically correct response of the applications is provided with the same metadata stack used by the applications. The present embodiments enable two or more applications to analyze the same datapoints without having to transmit all the datapoints. Thereby, computing and network resources are saved.

In an embodiment, the metadata stack is generated by identifying the metadata string of interest associated with the assets. The metadata string includes the datapoints generated from data sensing and monitoring devices associated with the assets. For example, the metadata string includes sensor data of the assets in an industrial plant. Further, for referencability, the metadata string is associated with a unique identifier. Accordingly, the metadata stack may be considered as an aggregation of datapoints of interest in timeseries sensor data.

In an example, the metadata string may be generated by an operator while collecting suspicious datapoints. Properties of the datapoints are used to generate metadata string and thereby the metadata stack. This metadata stack may be shared with a domain expert. In another example, the operator and the domain expert may want to analyze multiple datapoints from operation of multiple assets to determine a common anomaly. In yet another example, the domain expert may identify areas of interest in a distribution of the time-series sensor data. These areas of interest may be used to generate the metadata stack. Further, associated datapoints may be accumulated based on the metadata stack.

In an embodiment, the metadata string is identified by enabling selection of datapoints of interest in the operation data. Further, the metadata string including properties of the selected datapoints is generated to include the asset identifier, the asset state of the assets, and time stamp of the event. The selection may be made using a Graphical User Interface (GUI) that enables an operator/user to select the datapoints. The datapoints may be selected based on user interest and/or an event associated with the assets. The term operator/user does not refer only to human and may include machine or humanoid that is able to select the datapoints of interest.

In an embodiment, the selection of datapoints may be done automatically based on the event. As used herein, the event includes occurrence of an anomaly or occurrence of a predetermined condition. In certain scenarios, an unknown anomaly may be identified by a condition monitoring application using pattern recognition algorithms. Accordingly, the condition monitoring application selects the datapoints for the creation of the metadata string. Further, the condition monitoring application may be able to identify the datapoints that represent the event based on a pre-determined threshold.

As used herein, the predetermined threshold may include the number of datapoints that precede and follow the event detection. An example of the predetermined threshold may include 100 datapoints before and after the event detection. In another example, the predetermined threshold may include 100 datapoints prior to event detection. The identified datapoints may be used to simulate the event and selected for the metadata stack based on the simulation. Simulation of the event may be performed on the shared service when the datapoints are identified in the first application.

In an embodiment, the metadata stack may also include access policies indicating the applications that have access to the metadata stack. Also, the metadata stack may include organization information associated with the assets. In an embodiment, the metadata stack may include a flag to indicate one or more contents of the metadata stack that have been changed. Further, the metadata stack may include a generated location of the operation data and a stored location of the operation data.

After the metadata stacks are generated, the metadata stacks are available for the applications for referencing and/or consumption. In an embodiment, the metadata stack may be referenced or made accessible by publishing the metadata string to the shared service between the first application and the second application. As used herein, the shared service includes a central service hosted on a computing platform and/or native tools of an operating system of the first application and the second application. The shared service may be configured with commands such as create, read, update, and delete.

In an embodiment, the shared service may be configured to receive a publication request from the first application to publish the metadata stacks. Further, the shared service may be configured to receive an access request from a second application of the at least two applications. Further, the shared service may be configured to add some intelligence to the metadata stack. For example, the shared service may list common parameters across the assets referenced in the metadata stack. Further, the shared service may be configured with an application programming interface (API) functionality to retrieve the datapoints that are referred in the metadata stack. Further, the shared service is configured to update existing API functionalities to recognize non-contiguous datapoints associated with a single asset.

The computing platform hosting the shared service may be either a cloud computing platform or a fog computing platform. The cloud computing platform includes an operating system that connects, collects, and gets context from the operation data of the assets. Applications may be hosted on the cloud computing platform to visualize the operating data in real-time and also generate analytic results in one centralized location. The fog computing platform may include condition monitoring application that may interact with the applications on the cloud computing platform. For example, the condition monitoring application may enable easy engineering for data analytics applications hosted on the cloud computing platform. The metadata stack may be generated using the condition monitoring application on the fog computing platform, which may be used by the data analytics applications hosted on the cloud computing platform.

As used herein, "cloud computing" refers to a processing environment including configurable computing physical and logical re-sources (e.g., networks, servers, storage, applications, services, etc.) and data distributed over the network (e.g., the Internet). The cloud computing system provides on-demand network access to a shared pool of the configurable computing physical and logical resources. The network is, for example, a wired network, a wireless network, a communication network, or a network formed from any combination of these networks.

As used herein, "fog computing" refers to a network of edge devices in a facility that may act as a gateway to the cloud computing platform. The edge devices may be light weight, low cost devices that collect data from various sensors and actuators deployed in a plant, store and buffer the collected data, conduct analysis of the collected data, and perform an action (e.g., issuing a control command) based on the outcome of analysis. The edge devices may also be configured to aggregate, filter, selectively report, compress, encrypt, and/or otherwise pre-process the plant data, resulting in less data and/or value added data being communicated to the IoT cloud platform. This may lead to consumption of less network communication and backend storage and processing resources than may have been required or consumed absent such pre-processing. Typically, each of the edge devices may perform the above functions using one or more software applications deployed therein.

Some applications are configured to execute using metadata stacks as their input. In certain scenarios, the metadata stacks may be configured to restrict operations that may be performed using the application. In other scenarios, the metadata stacks may contain insufficient datapoints for some applications. The decision whether the metadata stacks are valid input or contains sufficient datapoints for a given application may be determined using the shared service. The shared service may be configured to enable the second application to decide whether the metadata stacks as suitable for execution without accessing the referenced datapoints (e.g., datapoints associated with the metadata stacks) by simulation (e.g., dry run). Accordingly, the shared service enables the second application to understand whether the metadata stack is a valid input. Access to the datapoints is provided when the metadata stacks is not suitable for adequate execution of the second application.

The shared service acts as a connection between the different applications. Considering the example of the first application and the second application, the shared service may be accessed via a GUI. The GUI may be generated through a display device that enables a user to access and modify the metadata stacks. In an embodiment, the shared service is indicated as an item in the toolbar of the first application and the second application. For example, the shared service is represented as a cart indicating the list of metadata stacks that are accessible. The features of the GUI may be modified to indicate that the metadata stacks are available. Modification examples may include flashing/blinking or change of color of the item in the toolbar.

In an embodiment, the shared service is configured to indicate active metadata stacks to the applications. As used herein, the active metadata stacks refer to metadata stacks that are available in a given session that is active between the first application and the second application. For example, the metadata stacks that are available in the item of the toolbar may be considered as active metadata stacks. Further, the first application and the second application are able to change the contents of the active metadata stack. In some scenarios, the first application or the second application may be able to change the status of the metadata stack, using the shared service, from active to inactive or vice versa.

In some embodiments, the first application and the second application may be used to generate the metadata strings. The datapoints of interest may be selected by operating the first application and the second application in the same session. The metadata string is generated based on the datapoints of interest. During the session, the metadata stack may be generated by associating the metadata strings with the unique identifier. The metadata stack may be open for modifications by the first application and the second application. The first application and the second application may modify the metadata strings in the metadata stack. In such situations, the metadata stack may be considered as active.

In an embodiment, the shared service is provided part of the Operating System that is used for the execution of the first application and the second application. For example, the first application relates to generation of correlation co-efficient in the operation data of the assets. The second application relates to monitoring of tasks associated with the assets. Both the applications may be executed on the device that is used for managing operation of the assets. The shared service refers to the native tools in the Operating system of the device. The native tools are configured to perform one or more commands, such as copy command, a paste command, and a snip command. In an example, the first application enables the datapoints/region of interest to be copied to a clipboard of the Operating System. The second application is configured to recognise the metadata stack based on the datapoints copied on the clipboard. The present embodiments share observations via the metadata stacks across the first application and the second application without requiring manual copying and saving/pasting of the referenced datapoints.

The present embodiments are advantageous in a distributed computing environment (e.g., in case of cloud computing and fog computing). In distributing computing environments, micro-service based applications may be used to replace monolithic applications. Interaction between the applications in such an environment may be achieved using direct API calls. However, such applications may need to be tightly coupled and cannot be seen as completely independent services. Further, the user context is the same (e.g., no exchange between entities that work independently). The present embodiments enable non-interactive, independent applications in such a distributed environment to function smoothly. Users and application developers may use non-contiguous data in the applications and share the same with other users/applications. The metadata stack may also be used to design applications such that data may be shared seamlessly.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the scope of the disclosure in its broadest form.

BRIEF DESCRIPTION OF THE DRAWINGS

FIG. 4 illustrates a flow diagram of an example methodology of managing data between applications, according to an embodiment; and FIG. 5 illustrates a flow diagram of an example methodology of managing data between applications, according to an embodiment.

DETAILED DESCRIPTION

Figure 1:
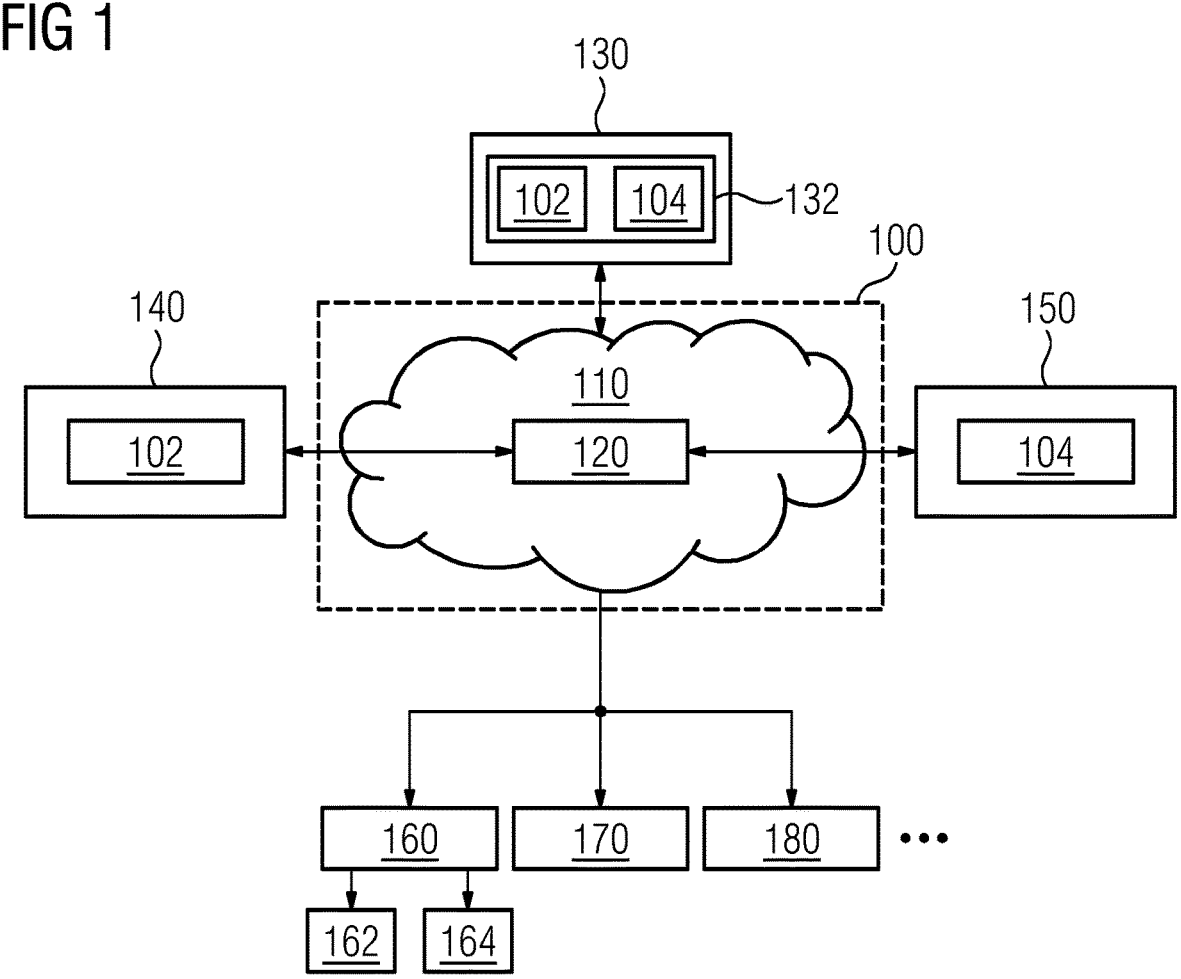
FIG. 1 illustrates a system and device for managing applications configured to manage operations associated with assets, according to an embodiment.

Hereinafter, embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. Such embodiments may be practiced without these specific details.

FIG. 1 illustrates a system 100 and a device 130 for managing applications 102 and 104 configured to manage operations associated with assets 160, 162, 164, 170, and 180, according to an embodiment. The assets 160, 162, 164, 170, and 180 may be equipment, actuators, robots, machinery in an industrial set-up(s). The devices may be medical devices and equipment in a healthcare unit. The devices may be home appliances or office appliances in a residential/commercial establishment. The operation of the assets 160, 162, 164, 170, and 180 may be measured using sensors and is herein referred to as operation data including one or more datapoints.

The assets 160, 162, 164, 170, and 180 are managed using applications 102 and 104. Example applications may include condition monitoring applications, anomaly detection applications, event management applications, design and configuration applications, fleet management applications, etc. The applications 102 and 104 may be executed on separate devices 140 and 150, respectively. In another embodiment, the applications 102 and 104 may be executed on the device 130 with operating system 132.

The system 100 includes a cloud computing platform 110 that hosts a shared service 120. The shared service 120 is used to communicate metadata stacks between the applications 102 and 104. A metadata stack includes properties associated with one or more contiguous or non contiguous datapoints in the operation data of at least one of the assets 160, 162, 164, 170, and 180.

The metadata stack may be generated by either one of the applications 102 or 104 or both. For example, the application 102 generates a distribution of the operation data of asset 162. Further, the application 104 generates a distribution of the operation data of asset 164. The metadata stack may be generated by identifying regions of interest in the distribution of the operation data associated the asset 162.

The shared service 120 may be configured with features such as create, read, update, and delete to enable generation of the centrally managed metadata stack from the region of interest or by selecting datapoints of interest. In some embodiments, the shared service 120 may be configured to provide additional parameters based on the metadata stack. Example parameters include list of common properties across the assets in the metadata stack. For example, if operation data of assets 162, 164 were referenced in the metadata stack, the shared service 120 may additionally add the parameter of the relationship with the asset 160 that is communicatively coupled to assets 162 and 164.

Further, the shared service 120 may be configured with application programming interface (API) functionality to retrieve the operation data referred in the metadata stack. Further, the shared service 120 may be configured with APIs to extract operation data from associated with more than one asset, such as assets 162 and 164. When the applications 102 or 104 are to be executed using the metadata stack, the shared service 120 may be configured to provide a simulation environment to dry run the application 102 or 104 to check whether the metadata stack is suitable for the application 102 or 104.

Figure 2:
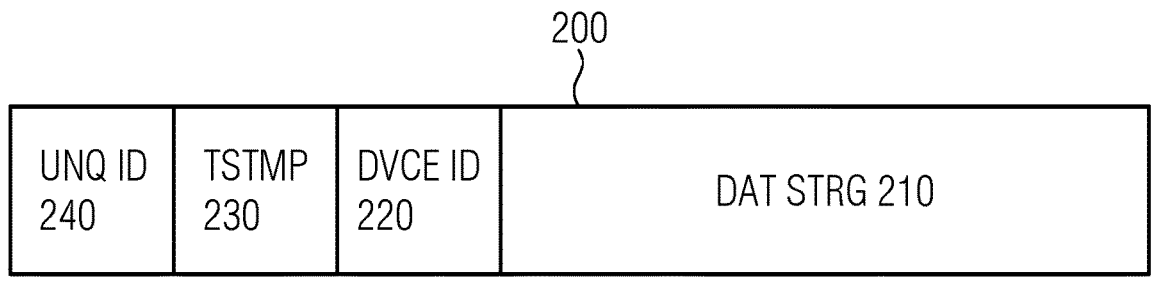
FIG. 2 illustrates a metadata stack, according to an embodiment.

The contents of the metadata stack may be used to determine whether the metadata stack is suitable for an application. The contents of the metadata stack is described hereinafter. FIG. 2 illustrates a metadata stack 200, according to an embodiment. The metadata stack 200 includes a metadata string 210, an asset identifier 220, a time stamp 230, and a unique identifier 240.

The metadata string 210 includes datapoints in the operation data generated from the sensors associated with the assets 160, 162, 164, 170, and 180. For example, the metadata string includes the operation data of the asset 170 in time series from a first time instance to a second time instance. The metadata string 210 may be generated by an operator while collecting suspicious datapoints in the operation data of more than one asset such as asset 160, 162, and 164. Properties of the datapoints are used to generate the metadata string 210 and thereby the metadata stack 200.

The asset identifier 220 provider indicates the assets referenced in the metadata stack 200. For example, the asset identifier 220 may also include asset type and model. For example, the asset 170 is a turbine, and the asset 180 is a pump. The asset identifier 220 may include an identifier for the asset 170 and the asset 180, type of asset (e.g., turbine and pump), and model of the turbine and the pump. In some embodiments, the asset identifier 220 may also include information regarding the manufacture and design of the assets 160, 162, 164, 170, and 180.

The time stamp 230 is used to identify the time at which the metadata stack was generated. The time stamp 230 may be used to manage multiple versions of the metadata stack 200. Further, for easy referencing of the metadata stack 200 across the applications 102 and 104, the unique identifier 240 is provided.

The metadata stack 200 may be provided for an operator to be able to collect suspicious datapoints from multiple assets and share the suspicious datapoints with a domain expert. The metadata stack 200 enables an operator wanting to collect datapoints while viewing the operation data or statistical models of the operation data without exiting the application. By not restricting asset types, the metadata stack 200 may be scaled to large set-ups with varied assets. The metadata stack 200 enables resolution of dis-ambiguities, such as common variable names across different and non-related assets.

Further, the unique identifier 240 may be used to incorporate a short description of the metadata stack 200. Thereby, the meaning of the metadata stack 200 may be understood by multiple applications/users over a period of time. Accordingly, the metadata stack 200 may be used to obtain a preview of the datapoints that are referenced. This enables applications to determine whether the metadata stack 200 is valid input without manually downloading all the referenced datapoints.

Figure 3:
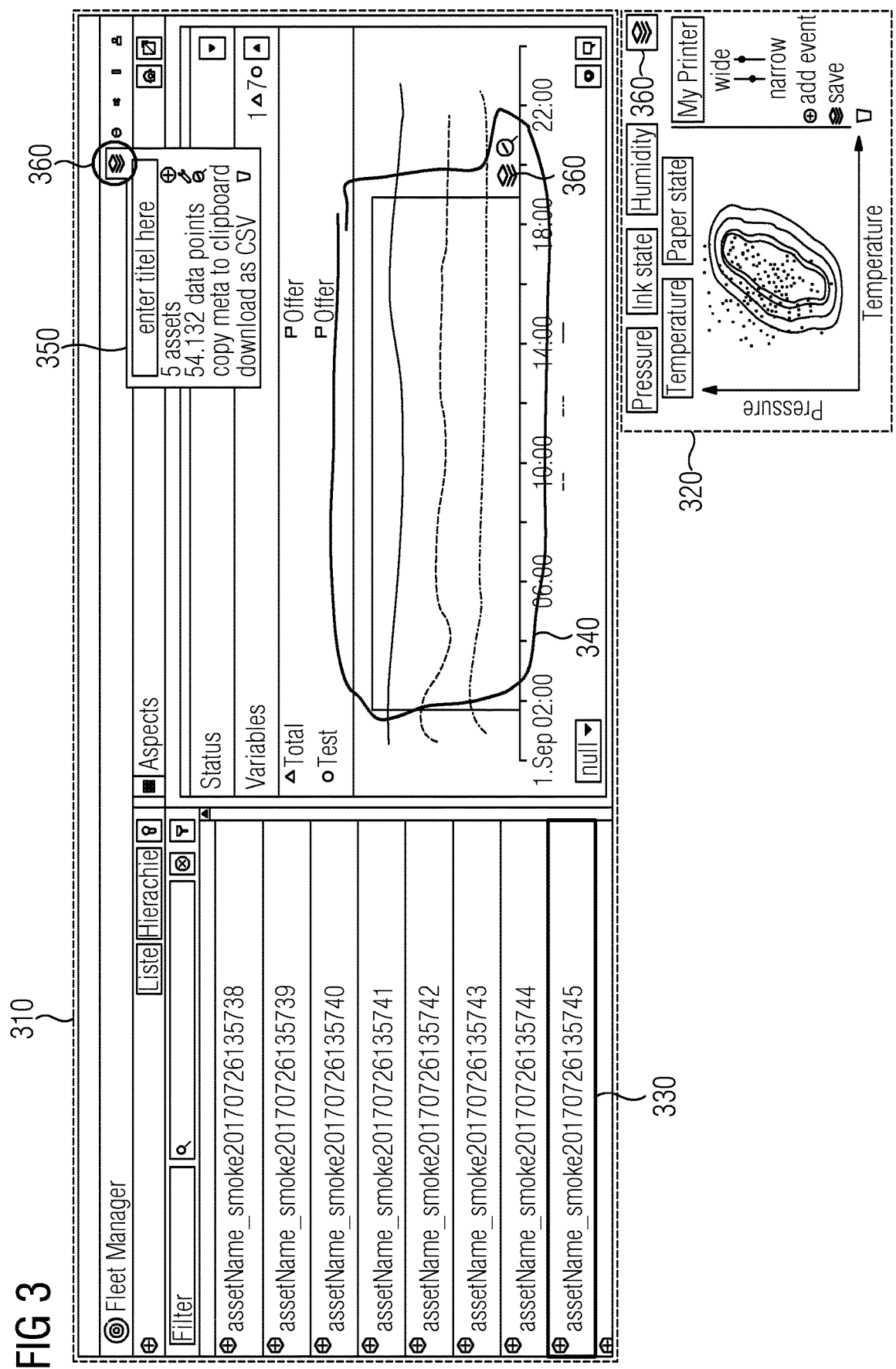
FIG. 3 illustrates graphical user interfaces (GUIs) for applications configured to manage operations associated with assets, according to an embodiment.

FIG. 3 illustrates Graphical User interfaces (GUIs) 310 and 320 for applications configured to manage operations associated with a fleet of assets, according to an embodiment.

The applications are exemplary applications that relate to a fleet management application/solution and an anomaly detection (AD) application. The fleet management (FM) application may be used to monitor fleet operation data of the fleet of assets. The FM application may be configured to automatically issue alerts based on events identified in the fleet operation data. The AD application may be a separate service that is called by the FM application to identify anomalies or unusual patterns in the fleet operation data. The AD application may be enabled to detect unknown anomalies through rule-free analysis, detecting the first signs of unknown operation data, on any machine across the fleet of assets.

The GUIs 310 and 320 are hereinafter referred to as FM GUI 310 and AD GUI 320 for the FM application and the AD application, respectively. The FM GUI 310 includes an asset field 330 that indicates the fleet of assets. The FM GUI 310 includes a time series chart that indicates the field operation data with respect to time. The time series chart is used to select datapoints of interest 340. Further, the FM GUI 310 includes a stack-create tool 360. The stack-create tool 360 includes a drop-down 350. The stack-create tool 360 is used to generate a metadata stack.

The AD GUI 320 indicates a pressure and temperature distribution associated with the datapoints of interest 340. The distribution is generated by the AD application using the data defined by the metadata stack generated by the stack-create tool 360.

The GUIs 310 and 320 are mere examples. The stack-create tool 360 may be indicated on the GUI directly or may be called when a user inputs a command, such as copy/snip.

In operation, when the datapoints of interest 340 are selected, stack-create tool 360 may be displayed at the selected location. The stack-create tool 360 enables the FM and AD applications to be "stack aware". In other words, the FM application may initiate/enable initiation of the metadata stack generation. In an embodiment, a user may proceed with the generation of the metadata stack by clicking on the stack-create tool 360.

In another embodiment, the FM application may be configured to determine whether the datapoints 340 are datapoints of interest or not. The determination may be made based on a predetermined threshold. The predetermined threshold may provide a minimum number of datapoints that are required for the metadata stack. In case an event is identified by the FM application, the predetermined threshold may include the number of datapoints that precede and follow the event. For example, the predetermined threshold may include 100 datapoints before and after the event detection. The identified datapoints may be used to simulate the event and is then selected as datapoints of interest 340.

The metadata stack is generated by a shared service that is linked to the stack-create tool 360. The metadata stack is generated using the datapoints of interest 340. The metadata stack includes a metadata string with properties of the datapoints of interest 340, a unique identifier, and a time stamp.

The AD application is informed of the metadata stack via the stack-create tool 360 provided on the AD GUI 320. The AD application may receive an application program interface (API) for using the metadata stack from the shared service. The AD application may directly import the metadata stack for execution. In an embodiment, a dry run of the AD application is performed using the shared service. The dry run is used to decide whether the metadata stack is valid input for the AD application. Further, the dry run is used to decide whether the datapoints of interest 340, referenced in the metadata stack, are to be downloaded. This is relevant in case the metadata stack is created with restrictions on the usage of the metadata stack.

To summarize, FIG. 3 illustrates transportation of the operation data of the assets across heterogenous applications (e.g., FM application and AD application). The application consuming the metadata stack is configured to determine semantically correct operations. The shared service is a stack management server that enables extraction of the metadata stack even if the applications are not executed in the same session.

FIG. 4 illustrates a flow diagram 400 of an example methodology for managing data between applications associated with assets in an industrial setup, according to an embodiment. Example assets are pumps and a turbine. Operation data from the assets are indicated by numerals pump 402, pump 404, and turbine 406. Further, the operation data may be appended with an asset status 408.

The method begins with act 405, with detection of an event in an asset management application. An operator/expert may want to drill down to identify a cause of the event. At act 410, the detected event is selected, and a copy instruction is initiated via/by the asset management application. For example, at act 410, the event is selected by pressing command for copy (e.g., CTRL+C).

At act 420, the asset management application recognizes that an event is selected. The asset management application generates a metadata string representing the event and including asset identifiers of the pumps 402, 404 and turbine 406 that are associated with the event. Further, at act 420, the asset management application sends a POST request to a shared service and transmits the generated metadata string. In an example, the POST request may include the following instructions:

```
{assets:["Turbine"],
 timeRange:{
   from:"2019-09-30...",
   to:"2019-10-02..."}
}
```

A metadata stack is generated using the metadata string and is associated with a unique identifier.

At act 430, a second application such as a data analysis application is used to further analyze the event. The data analysis application may initiate/enable a paste operation such as CTRL+V. Through this operation, the data analysis application is made aware of the metadata stack.

At act 432, a determination is made whether the data analysis application is connected to a shared service hosted on a computing platform. Act 434 addresses the possibility that there is no connection to the shared service on the computing platform. At act 434, native tools, such as clipboard, of operating system of the device is considered as the shared service. This example enables the functionality without access to the computing platform. By copying the metadata stack instead of datapoints/operation data to the clipboard, the present method saves computing resources. For example, a number of gigabytes of operation data may be used to determine the event. The API of the metadata stack enables the data analysis application to retrieve only an aggregation (e.g., the metadata stack), which reduces the data to only a few megabytes. Further, the data analysis application may be configured to accept the metadata stack as a valid input, and therefore, by default, only the metadata stack is fetched from the clipboard. Accordingly, by sharing the metadata stack, only a small subset of the operation data referenced is to be received.

At act 436, the shared service on the cloud computing platform is accessed. For example, the shared service may be accessed using a Hypertext Transfer Protocol (HTTP) Uniform Resource Locator (URL). Both acts 434 and 436 result in act 438 with the data analysis application sending an HTTP GET request to the shared service (e.g., including native tools) to receive the metadata stack. Further, act 438 may also include retrieving the operation data referenced in the metadata stack. At act 440, the data analysis application generates a visualization based on the metadata stack and the operation data selected at act 420.

FIG. 5 illustrates a flow diagram 500 of an example methodology that manages data between applications, according to an embodiment. The method begins at act 510 with identifying datapoints of interest in operation data associated with assets. The datapoints of interest associated with the assets may be identified in a first application that uses the operation data. For example, a domain expert may identify areas of interest in a distribution of the operation data. The area of interest is used to identify the datapoints of interest. In another example, the datapoints of interest may be determined based on detection of an event or anomaly in the operation data.

At act 520, the metadata stacks are generated based on the datapoints of interest. For example, the metadata stacks are generated from metadata strings including properties of the datapoints of interest. Accordingly, at act 520, a metadata string associated with the assets is generated. For example, the metadata string includes a device identifier, a device state of the assets, and a time stamp of the event. Further, for referencability, the metadata string is associated with a unique identifier. Accordingly, the metadata stack may be considered as an aggregation of datapoints of interest in the operation data.

At act 530, the metadata stacks are published to a shared service between a first application and a second application. The shared service is a common service that may be accessed via the operating system of the device executing the first application and the second application. Alternatively, the shared service may be accessed via a network that communicatively connects the first application and the second application to a computing platform that hosts the shared service. In an embodiment, at act 530, a graphical user interface (GUI) may be generated through a display device that enables access and modification of the metadata stacks by the first application and/or the second application.

At act 540, access to the metadata stacks is enabled, where the first application and the second applications are capable of accessing the metadata stack and datapoints associated with the metadata stack. Further, features of the GUI may be modified to indicate that the metadata stacks are accessible. The datapoints associated with/referenced in the metadata stacks are accessed based on a dry run of the first/second application. Accordingly, act 540 includes determining that the first/second application is not adequately executable using the metadata stacks and transmitting the datapoints to the first/second application based on the determination.

The present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or a semiconductor system (or apparatus or device); propagation mediums in and of themselves as signal carriers are not included in the definition of physical computer-readable medium. The physical computer-readable medium may include a semiconductor or solid state memory, magnetic tape, a removable computer diskette, random access memory (RAM), a read only memory (ROM), a rigid magnetic disk, and an optical disk such as compact disk read-only memory (CD-ROM), compact disk read/write, and DVD. Both processors and program code for implementing each aspect of the technology may be centralized or distributed (or a combination thereof) as known to those skilled in the art.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for sharing data between at least two applications, the method, through operation of at least one processor, comprising:

generating, by a first application of the at least two applications in a distributed computing environment, one or more metadata stacks associated with one or more assets, wherein the one or more metadata stacks include at least one metadata string generated based on operation of the one or more assets; and enabling access to the one or more metadata stacks, wherein a second application of the at least two applications is operable to access the one or more metadata stacks and datapoints associated with the one or more metadata stacks, wherein enabling access to the one or more metadata stacks comprises:

publishing the one or more metadata stacks to a shared service between the first application and the second application, wherein the shared service includes a central service hosted on a computing platform, native tools of an operating system of the first application and the second application; and enabling access to the datapoints associated with the one or more metadata stacks via the shared service, and wherein generating a metadata string of interest of the at least one metadata string associated with the one or more assets comprises:

enabling selection of datapoints of interest via the first application, wherein the datapoints are selected based on a user interest associated with the one or more assets, an event associated with the one or more assets, or the user interest and the event associated with the one or more assets, wherein the event includes occurrence of an anomaly or occurrence of a predetermined condition; and generating the metadata string comprising the properties of the selected datapoints, wherein the metadata string includes a device identifier, a device state of the one or more assets, or a time stamp of the event.

2. The method of claim 1, wherein generating the one or more metadata stacks associated with the one or more assets comprises:

generating the at least one metadata string associated with the one or more assets, wherein the at least one metadata string comprises properties of datapoints generated from data sensing and monitoring devices associated with the one or more assets; and associating the at least one metadata string with a unique identifier.

3. The method of claim 1, wherein enabling selection of the datapoints comprises:

identifying the datapoints in operation data that represent the event based on a predetermined threshold; and selecting the datapoints, the selecting of the datapoints comprising simulating the event using the identified datapoints.

4. The method of claim 1, further comprising:

generating a graphical user interface (GUI) through a display device that enables access and modification of the one or more metadata stacks by the first application, the second application, or the first application and the second application; and modifying features of the GUI to indicate that the one or more metadata stacks are accessible.

5. The method of claim 1, further comprising:

determining that the second application is not adequately executable using the one or more metadata stacks, wherein the one or more metadata stacks are determined as not adequately executable based on whether the second application is executable using the one or more metadata stacks without accessing the associated datapoints, by the shared service, wherein the shared service is configured to enable the second application to decide whether the one or more metadata stacks are suitable for execution by simulation to understand whether the one or more metadata stacks are valid inputs; and transmitting the datapoints to the second application based on the determination.

6. In a non-transitory computer-readable storage medium that stores instructions executable by at least one processor for sharing data between at least two applications, the instructions comprising:

generating, by a first application of the at least two applications in a distributed computing environment, one or more metadata stacks associated with one or more assets, wherein the one or more metadata stacks include at least one metadata string generated based on operation of the one or more assets; and enabling access to the one or more metadata stacks, wherein a second application of the at least two applications is operable to access the one or more metadata stacks and datapoints associated with the one or more metadata stacks, wherein enabling access to the one or more metadata stacks comprises:

publishing the one or more metadata stacks to a shared service between the first application and the second application, wherein the shared service includes a central service hosted on a computing platform, native tools of an operating system of the first application and the second application; and enabling access to the datapoints associated with the one or more metadata stacks via the shared service, and wherein generating a metadata string of interest of the at least one metadata string associated with the one or more assets comprises:

enabling selection of datapoints of interest via the first application, wherein the datapoints are selected based on a user interest associated with the one or more assets, an event associated with the one or more assets, or the user interest and the event associated with the one or more assets, wherein the event includes occurrence of an anomaly or occurrence of a predetermined condition; and generating the metadata string comprising the properties of the selected datapoints, wherein the metadata string includes a device identifier, a device state of the one or more assets, or a time stamp of the event.

7. A computing platform for managing at least two applications, the computing platform comprising:

a processor configured to execute a shared service between the at least two applications in a distributed computing environment, wherein the shared service is configured to enable access to one or more metadata stacks generated by a first application of the at least two applications, the shared service comprising:

native tools of an operating system of the first application, wherein the at least two applications are configured to manage operation of one or more assets using the computing platform, wherein the one or more metadata stacks include at least one metadata string generated based on operation of the one or more assets, wherein the native tools are configured to perform at least one command, and wherein the at least one command includes a copy command, a paste command, a snip command, or any combination thereof.

8. The computing platform according of claim 7, wherein the shared service is further configured to:

receive a publication request from the first application to publish the one or more metadata stacks;

receive an access request from a second application of the at least two applications; and enable the second application to access the one or more metadata stacks.

9. The computing platform of claim 7, wherein the shared service is further configured to:

enable the second application to simulate whether the one or more metadata stacks are suitable for execution of the second application; and enable access to operation data when the second application is not adequately executable using the one or more metadata stacks.

10. A device for managing at least two applications, the device comprising:

a firmware module comprising:

an operating system including one or more native tools; and
a first application of the at least two applications configured to:
generate one or more metadata stacks associated with one or more assets, wherein the one or more metadata stacks include at least one metadata string generated based on operation of the one or more assets,
wherein the first application enables access to operation data via the one or more metadata stacks using the native tools,
wherein the native tools are configured to perform at least one command, and
wherein the at least one command includes a copy command, a paste command, a snip command, or any combination thereof.

11. The device of claim 10, further comprising:
a second application of the at least two applications, the second application being configured to analyze the operation data of the one or more assets,
wherein the second application is operable to perform the analysis using the one or more metadata stacks, the operation data, or the one or more metadata stacks and the operation data.

* * * * *